US000001417H

United States Statutory Invention Registration [19]

[11] Reg. Number: H1417

Yalvac et al. [43] Published: Feb. 7, 1995

[54] PROCESS FOR REMOVING HALOGEN GASES FROM A GAS STREAM CONTAINING CARBON DIOXIDE

[75] Inventors: Engin D. Yalvac; Robert A. Bredeweg; Douglas C. Greminger, all of Midland, Mich.

[73] Assignee: The Dow Chemical Company, Midland, Mich.

[21] Appl. No.: 10,088

[22] Filed: Jan. 27, 1993

[51] Int. Cl.[6] ..... C01B 7/00

[52] U.S. Cl. ..... 423/240 R; 423/488; 588/205

[58] Field of Search ..... 423/210, 240, 241, 240 R, 423/240 S

[56] References Cited

U.S. PATENT DOCUMENTS 5,102,638 4/1992 Girrbach et al. ..... 423/241
5,238,665 8/1993 Lerner ..... 423/240 S

FOREIGN PATENT DOCUMENTS 0406675 6/1990 European Pat. Off. .
0106989 of 1974 Japan .

*Primary Examiner*—Robert L. Stoll
*Assistant Examiner*—Joseph D. Anthony
*Attorney, Agent, or Firm*—Timothy S. Stevens

[57] ABSTRACT

A process for removing halogen gases from a gas stream containing carbon dioxide such as flue gas from an industrial waste incinerator burning chlorinated organic wastes, the process includes seven steps. The first step is to flow fresh absorption liquor to a gas-liquid contactor (such as a column packed with pall rings) the fresh absorption liquor containing water, base and thiosulfate (such as sodium carbonate and sodium thiosulfate). The second step is to flow the gas stream to the gas-liquid contactor. The third step is to contact the fresh absorption liquor and the gas stream in the gas-liquid contactor to form a contacted gas stream and a contacted absorption liquor. The fourth step is to flow the contacted gas stream from the gas-liquid contactor to form an exhaust gas stream from the process. The fifth step is to flow the contacted absorption liquor from the gas-liquid contactor to form used absorption liquor. The exhaust gas must have a concentration of halogen gases that is less than half the concentration of halogen gases in the original gas stream and the exhaust gas must have a concentration of carbon dioxide that is more than half the concentration of carbon dioxide in the original gas stream.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR REMOVING HALOGEN GASES FROM A GAS STREAM CONTAINING CARBON DIOXIDE

BACKGROUND OF THE INVENTION

The conventional process for removing halogen gasses such as chlorine ($Cl_2$) from gas streams is to contact the gas stream with sodium hydroxide solution. The chlorine reacts with the sodium hydroxide to form sodium hypochlorite and sodium chloride.

Industrial waste incinerators are increasingly being used to destroy industrial wastes. When halogenated organic wastes are burned in an industrial waste incinerator, then the flue gas from the incinerator can contain halogens such as chlorine and/or bromine ($Br_2$) which can not be discharged into the environment. Contacting the flue gas from an industrial incinerator with sodium hydroxide solution is an effective means of removing the halogen gas from the flue gas when the incinerator is burning halogenated organic wastes. However, the flue gas also contains carbon dioxide (for example, about 20% carbon dioxide by volume) and this carbon dioxide reacts with the sodium hydroxide solution to form sodium carbonate.

The reaction between carbon dioxide and sodium hydroxide increases the amount of sodium hydroxide needed to remove the halogens from the flue gas of the incinerator. In addition, the sodium hypochlorite formed is corrosive to ordinary steel or fiber reinforced plastic (FRP) process equipment and excessive amounts of sodium hypochlorite can not be discharged into the environment. It would be an advanced in the art of removing halogen gasses from gas streams containing carbon dioxide if a process were invented that reduced the amount of sodium hydroxide needed and which resulted in more environmentally acceptable output streams.

SUMMARY OF THE INVENTION

The instant invention reduces the amount of sodium hydroxide needed to remove halogens from gas streams that contain carbon dioxide and produces environmentally acceptable output streams. The instant invention is a process for removing halogen gases from a gas stream containing a concentration of halogen gases and a concentration of carbon dioxide such as flue gas from an industrial waste incinerator burning chlorinated organic wastes, the process comprising five steps. The first step is to flow fresh absorption liquor to a gas-liquid contactor at a flow rate, the fresh absorption liquor comprising water, a concentration of base and a concentration of reducing agent. The second step is to flow the gas stream to the gas-liquid contactor at a flow rate. The third step is to contact the fresh absorption liquor and the gas stream in the gas-liquid contactor to form a contacted gas stream and a contacted absorption liquor, the flow rate of fresh absorption liquor, the concentration of base in the fresh absorption liquor and the concentration of reducing agent in the fresh absorption liquor relative to the flow rate of the gas stream, the concentration of halogen gases in the gas stream and the concentration of carbon dioxide in the gas stream being sufficient to remove more than half of the halogen gases from the gas stream by a chemical reaction with the fresh absorption liquor, more than half of the carbon dioxide from the gas stream not being removed from the gas stream. The fourth step is to flow the contacted gas stream from the gas-liquid contactor to form an exhaust gas stream from the process, the exhaust gas stream containing less than half the halogen gas than the gas stream contained, the exhaust gas stream containing more than half the carbon dioxide than the gas stream contained. The fifth step is to flow the contacted absorption liquor from the gas-liquid contactor to form a stream of used absorption liquor.

The process of the instant invention can further include the steps of: flowing a portion of the used absorption liquor to waste thereby leaving a remaining portion of used absorption liquor; and adding water, reducing agent and base to the remaining portion of used absorption liquor to form fresh absorption liquor. The process of the instant invention can yet further include the steps of: analyzing the used absorption liquor for residual reducing agent and base; and controlling the adding of reducing agent and base to the remaining portion of used absorption liquor according to the analyses. The reducing agent can be thiosulfate or sulfite. However, thiosulfate is the most preferred reducing agent in the instant invention.

DETAILED DESCRIPTION OF THE INVENTION

Figure 1:
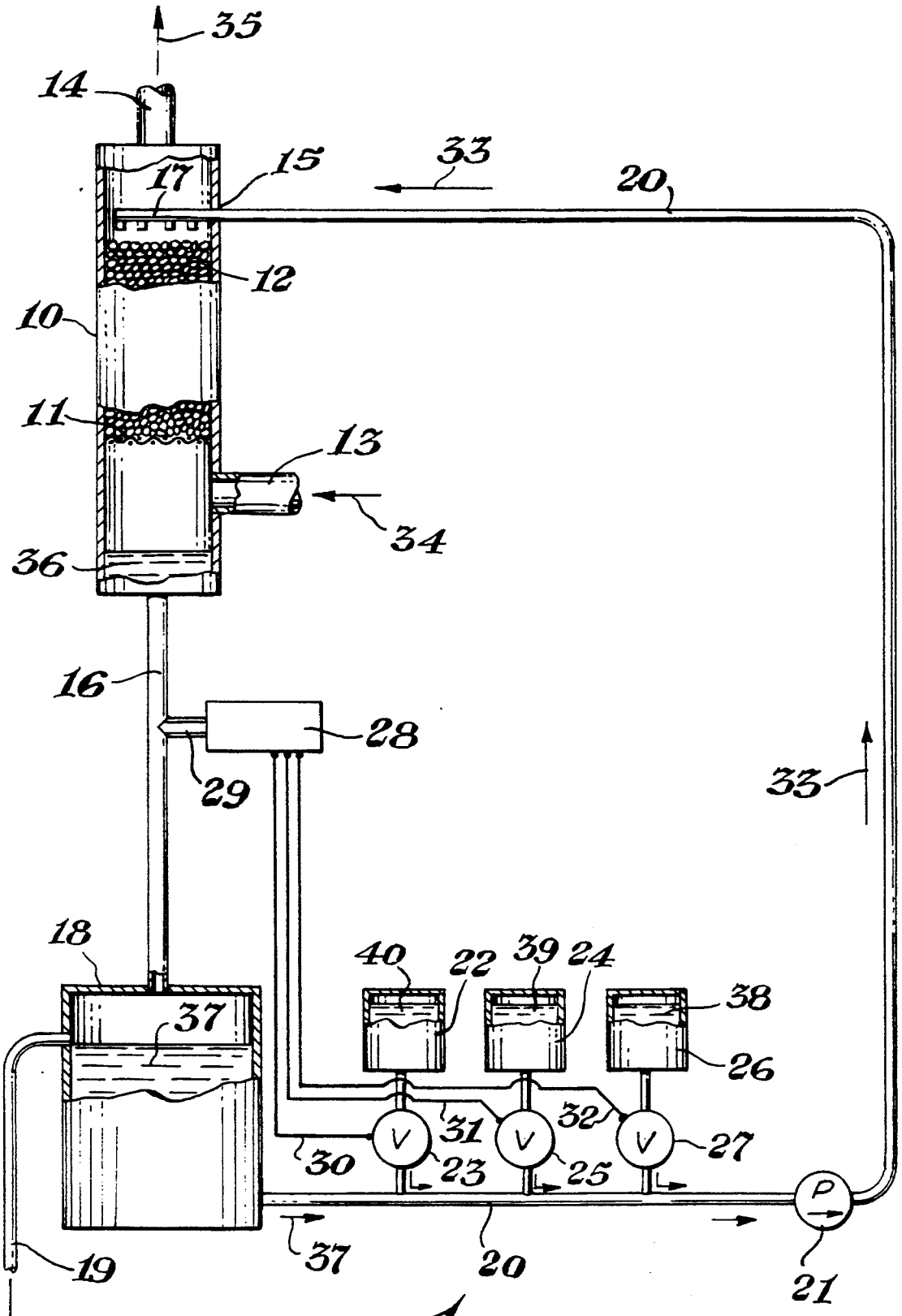
FIG. 1 is a schematic drawing of process equipment for practicing an embodiment of the instant invention.

Referring now to FIG. 1, therein is shown a schematic drawing of process equipment for practicing one embodiment of the instant invention including a gas-liquid contactor in the form a packed column 10. The packed column 10 contains a porous support plate 11 for supporting a bed of packing 12 such as a bed of pall rings, rasching rings, lessing rings, berl saddles, intalox saddles or tellerette rings. The packed column 10 has a gas inlet 13 and a gas outlet 14. The packed column 10 also has a liquid inlet 15 and a liquid outlet 16. A distributor 17, such as a ladder distributor, is connected to the liquid inlet 15 to evenly distribute liquid across the top of the bed of packing 12.

The liquid outlet 16 is connected to a recycle tank 18. The recycle tank 18 has an overflow leg 19. A recycle loop 20 of pipe connects the recycle tank 18 with the liquid inlet 15 of the packed column 10. A recycle pump 21 is placed in the recycle loop 20. A thiosulfate reservoir 22 is connected to the recycle loop 20 via a thiosulfate flow control valve 23. A base reservoir 24 is connected to the recycle loop 20 via a base flow control valve 25. A water reservoir 26 is connected to the recycle loop 20 via a water flow control valve 27. An analyzer 28 is connected to the liquid outlet 16 by a pipe 29. The analyzer 28 is also connected to the valves 23, 25 and 27 by wires 30, 31 and 32.

The process of the instant invention can also be understood by reference to FIG. 1. The present invention is a process for removing halogen gasses from a gas stream containing a concentration of carbon dioxide preferably greater than 0.1 percent by volume and more preferably greater than 1 percent by volume such as flue gas from an industrial waste incinerator used to burn halogenated organic wastes. It is well known that halogens such as chlorine are oxidizing reagents and will react with most reducing agents such as thiosulfate or sulfite. The instant invention in its broadest scope is a process comprising five steps.

The first step is to flow fresh absorption liquor 33 into the gas-liquid contactor liquid inlet 15 at a flow rate, the fresh absorption liquor containing water, a concentration of base and a concentration of thiosulfate. The term "the fresh absorption liquor containing water, a concentration of base and a concentration of thiosulfate" also includes separately feeding a thiosulfate solution and/or a base solution to the gas-liquid contactor. However, it is most preferable to feed the water, base and thiosulfate in a single solution. The term "base" means a Lowry-Bronsted base. In terms of commercial practicality, the preferred bases are sodium hydroxide and sodium carbonate. The most preferred base is sodium hydroxide because it is available in a concentrated liquid, i.e., 50 percent sodium hydroxide solution.

The fresh absorption liquor is distributed onto the top of the bed of packing 12 by the distributor 17. The fresh absorption liquor flows down through the bed of packing 12. The second step is to flow the gas stream 34 into the gas-liquid contactor gas inlet 13 at a flow rate. The gas stream flows up through the bed of packing 12. The third step is to contact the fresh absorption liquor 33 and the gas stream 34 in the gas-liquid contactor to form a contacted gas stream and a contacted absorption liquor.

In the packed column 10, the fresh absorption liquor 33 flowing down through the bed of packing 12 contacts with the gas stream 34 moving up through the bed of packing 12. The flow rate of fresh absorption liquor 33, the concentration of base in the fresh absorption liquor 33 and the concentration of thiosulfate in the fresh absorption liquor 33 relative to the flow rate of the gas stream 34, the concentration of halogen gases in the gas stream 34 and the concentration of carbon dioxide in the gas stream 34 must be sufficient to remove more than half of the halogen gases from the gas stream 34 by a chemical reaction with the fresh absorption liquor 33 and at the same time must not result in the removal of more than half of the carbon dioxide from the gas stream 34.

In addition, it is preferable that the pH of the contacted absorption liquor 36 not be allowed to drop below 7.4, i.e., not be allowed to become more acidic than a pH of 7.4. The specific values necessary for the flow rate of fresh absorption liquor 33, the concentration of base in the fresh absorption liquor 33 and the concentration of thiosulfate in the fresh absorption liquor 33 depend on the the flow rate of the gas stream 34, the concentration of halogen gases in the gas stream 34 and the concentration of carbon dioxide in the gas stream 34 as well as the efficiency of the gas-liquid contactor.

In some cases the concentration of halogen gases in the gas stream 34, the concentration of carbon dioxide in the gas stream 34 and the flow rate of the gas stream 34 are relatively constant. When this is the case, then the flow rate of the gas stream 34 times these concentrations results in a specific quantity of halogen and carbon dioxide per unit of time being fed into the gas-liquid contactor 10. Preferably, the fresh absorption liquor 33 contains enough of a quantity of thiosulfate over the same unit of time so that all or most all of the halogen gas is removed from the gas stream 34 by reaction with the thiosulfate. However, only one half of the halogen gases need to be removed.

The reaction between a halogen and thiosulfate also consumes base. Therefore, the fresh absorption liquor 33 needs to contain sufficient base for this reaction. The quantity of thiosulfate and base fed into the gas-liquid contactor 10 over this same unit of time depends on the concentration of thiosulfate and base in the fresh absorption liquor 33 times the flow rate of the fresh absorption liquor 33.

Gas-liquid contactors are best operated in specific ranges of gas input flow rate and liquid input flow rate. The specific value of these ranges depends on the specific gas-liquid contactor used. Therefore, when the concentration of halogen gases in the gas stream 34 and the concentration of carbon dioxide in the gas stream 34 are relatively constant and the flow rate of the gas stream 34 is within the operating range of the specific gas-liquid contactor used, then the concentration of thiosulfate and base needed in the fresh absorption liquor 33 will depend on the corresponding liquid flow rate requirements of the specific gas-liquid contactor used.

When a base like sodium hydroxide is used in the fresh absorption liquor 33, then a portion of the carbon dioxide in the gas stream 34 is converted to sodium carbonate. However, this portion must not be greater than one half of the original carbon dioxide concentration in the gas Stream or else one of the primary objectives of the instant invention will not be met. The portion of carbon dioxide that is converted to sodium carbonate is controlled by controlling the concentration of sodium hydroxide in the fresh absorption liquor 33 at the desired flow rate of fresh absorption liquor 33. The higher the concentration of sodium hydroxide is in the fresh absorption liquor 33 the larger will be the proportion of carbon dioxide that is removed. If an insufficient concentration of sodium hydroxide is used, then the contacted absorption liquor 36 will become undesirably acidic. When a base like sodium carbonate is used in the fresh absorption liquor 33, then little to none of the carbon dioxide in the gas stream 34 is converted to sodium carbonate.

The fourth step is to flow the contacted gas stream 35 from the gas-liquid contactor gas outlet 14 to form an exhaust gas stream from the process, the exhaust gas containing less than half the halogen gas than the gas stream contained, the exhaust gas stream containing more than half the carbon dioxide than the gas stream contained. The fifth step is to flow the contacted absorption liquor 36 from the gas-liquid contactor to form used absorption liquor 37.

The process of the instant invention can also include the step of flowing a portion of the used absorption liquor 37 to waste via the overflow leg 19 thereby leaving a remaining portion of used absorption liquor 37 in the recycle tank 18 and the step of adding water 38, sodium thiosulfate solution 40 and base 39 to the remaining portion of used absorption liquor to form fresh absorption liquor 33. The addition of water 38 to the used absorption liquor 37 is made via the water flow control valve 27. The addition of base 39 to the used absorption liquor 37 is made via the base flow control valve 25. The addition of thiosulfate 40 to the used absorption liquor 37 is made via the thiosulfate flow control valve 23. This embodiment of the instant invention allows an increased flow rate of fresh absorption liquor 33 without an increased flow rate to waste via the overflow leg 19.

In some applications the concentration of halogen gases in the gas stream 34 and the concentration of carbon dioxide in the gas stream 34 varies significantly with time. When this happens, then the concentration of thiosulfate and base in the fresh absorption liquor 33 needs to be correspondingly varied with time. This can be done by manually analyzing the used absorption liquor 37 or the contacted absorption liquor 36 for residual base and thiosulfate and then adding the appropriate amount of base and thiosulfate to the fresh absorption liquor. However, it is preferable to do this analysis on-line.

If the used absorption liquor 37 is analyzed for residual base and thiosulfate by the analyzer 28, then the addition of base 39 and thiosulfate 40 to the remaining portion of used absorption liquor 37 can be controlled by the flow control valves 23 and 25. The valve 27 is controlled to add make-up water to the process at about the same rate that water is lost from the process primarily via the overflow leg 19.

A preferred analyzer 28 is a flow injection analysis system using an iodimetric titration for the determination of thiosulfate and an acid/base titration for the determination of total alkalinity, Alternatively, the amount of base that is needed to be added to the used absorption liquor can instead be calculated from the amount of thiosulfate that is consumed across the bed of packing 12. In yet another alternative, the pH of the used absorption liquor can be monitored to determine the amount of base that is needed to be added to the used absorption liquor.

A number of reactions are believed to occur when the fresh absorption liquor 33 is contacted with the gas stream 34 in the bed of packing 12. In the upper portions of the bed of packing 12 a portion of the carbon dioxide in the gas stream 34 reacts with the sodium hydroxide, if it is used as the base, to form sodium carbonate and sodium bicarbonate.

However, as discussed above it is not desirable or necessary to consume all of the carbon dioxide of the gas stream 34 in this manner. What is desired is to convert all or most all of the sodium hydroxide of the fresh absorption liquor 33 to sodium carbonate and sodium bicarbonate in the upper portions of the packing 12 so that when it reaches the lower portions of the bed of packing 12 the reaction between sodium hydroxide and chlorine to form sodium chloride and sodium hypochlorite is minimized. If there is any sodium hypochlorite formed it reacts with the sodium thiosulfate to form sodium sulfate and sodium chloride with the consumption of base. The desired reaction in the lower portions of the bed of packing 12 is the reaction between sodium thiosulfate and chlorine to form sodium sulfate and sodium chloride with the consumption of base. Most preferably, almost all of the thiosulfate of the fresh absorption liquor 33 is consumed in the bed of packing 12 so that very little remains in the contacted absorption liquor 36.

Most preferably, the water 38 is soft water or deionized water so that build-up of scale is minimized in the packed column 10. Most preferably, the gas stream 34 is scrubbed with water prior to entering the gas inlet 13 if the gas stream 14 originally contained hydrogen chloride. An alternative to the use of the overflow leg 19 is the use of a level control in the tank 18.

The packed column 10 is not critical in the instant invention. Any gas-liquid contactor can be used but the packed column 10 is believed to be the best mode of the invention. A reference to standard chemical engineering texts, such as a recent edition of the well known Perry & Chilton *Chemical Engineers' Handbook* published by the McGraw-Hill Book Company will describe alternative gas-liquid contactors such as plate columns, falling-film columns, spray chambers, agitated vessels and in-line mixers.

The use of thiosulfate is highly preferred but not critical in the present invention. Any suitable reducing reagent which consumes base when it reacts with a halogen such as chlorine ($Cl_2$) can be used in place of thiosulfate in the instant invention. For example, sulfite can be used in place of thiosulfate in the instant invention. Sulfite is not as highly preferred as thiosulfate because a pH upset in the gas-liquid contactor is more likely to result in the emission of sulfur dioxide in the exhaust gas. It should also be possible to make sulfite in-situ in the loop 20 by injecting sulfur dioxide into the loop 20 after the pump 21 and before an in-line mixer placed into the loop 20.

EXAMPLE

The equipment as generally shown in FIG. 1 is assembled. The gas-liquid contactor 10 is a conventional 45 foot tall steel tower, 4.5 foot in diameter, having a bed of packing 12 that is 30 feet deep. The bed of packing 12 is composed of 2 inch Pall Rings. The flow rate of the gas stream 34 is about 350,000 standard cubic feet per hour. The flow rate of the fresh absorption liquor 33 is 60 gallons per minute. The concentration of the thiosulfate solution 40 is 30 percent sodium thiosulfate and it is introduced into the stream of used absorption liquor 37 at a flow rate determined by the on-line flow injection analysis analyzer 28 to control the residual thiosulfate in the used absorption liquor 37 at about 100 parts per million thiosulfate. The concentration of the sodium hydroxide base 39 is 50 percent and it is introduced into the stream of used absorption liquor 37 at a flow rate of 1.5 gallons per hour so that the residual pH of the used absorption liquor 37 is at a pH of about 8.5 as determined using a process grade pH probe.

The water 38 is deionized water and it is added to the stream of used absorption liquor 37 at a flow rate of 20 gallons per minute. About 20 gallons per minute of used absorption liquor 37 flows to waste via the overflow leg 19. The gas stream 34 contains a relatively constant concentration of carbon dioxide of about 15–20 volume percent with a varying concentration of chlorine, from about 50 to about 200 parts per million by volume, depending on the chlorine concentration of the waste being burned in the burner generating the gas stream 34. However, the gas stream 34 contains an average of about 7.6 pounds of chlorine gas per hour.

The analyzer 28 is a flow injection analysis system employing reagents of: (a) 0.5 N sulfuric acid; and (b) $2\times10^{-6}$ M potassium iodate and $2.6\times10^{-4}$ M potassium iodide. Each reagent is flowed at a flow rate of 1 milliliter per minute through an in-line mixer, then through an injection valve having a 39 microliter sample loop and then across an oxidation reduction potential (ORP) electrode (part number 5778685, phonix Electrode Corporation). The potential from the ORP electrode is converted to a 4–20 milliamp output and then converted to a voltage signal using two parallel 100 ohm resistors. The voltage signal is fed to a Spectra Physics model 4400 integrator to determine the peak width for an injection of used absorption liquor. The peak width is logarithmically related to the concentration of thiosulfate in the used absorption liquor. The peak width is fed to a process control system for controlling the valve 23.

When the concentration of chlorine in the gas stream 34 increases, then the concentration of thiosulfate in the used absorption liquor 37 decreases and the amount of thiosulfate solution 40 added to the system is automatically increased. When the concentration of chlorine in the gas stream 34 decreases, then the concentration of thiosulfate in the used absorption liquor 37 increases and the amount of thiosulfate solution 40 added to the system is automatically decreased.

The concentration of chlorine in the exhaust gas is less than 0.4 micrograms per cubic meter of exhaust gas. The concentration of carbon dioxide in the exhaust gas is essentially unchanged relative to the concentration of carbon dioxide in the original gas stream.

What is claimed is:

1. A process for removing halogen gases from a gas stream containing a concentration of halogen gases and a concentration of carbon dioxide, the process comprising the steps of:

(a) flowing fresh absorption liquid to a gas-liquid contactor at a flow rate, the fresh absorption liquor comprising soft water, a concentration of base and a concentration of thiosulfate;

(b) flowing the gas stream to the gas-liquid contactor at a flow rate:

(c) contacting the fresh absorption liquor and the gas stream in the gas-liquid contactor to form a contacted gas stream and a contacted absorption liquor, the flow rate of fresh absorption liquor, the concentration of base in the fresh absorption liquor and the concentration of thiosulfate in the fresh absportion liquor relative to the flow rate of the gas stream, the concentration of halogen gases in the gas stream and the concentration of carbon dioxide in the gas stream being sufficient to remove more than half of the halogen gases from the gas stream by a chemical reaction with the fresh absorption liquor, more than half of the carbon dioxide from the gas stream not being removed from the gas stream;

(d) flowing the contacted gas stream from the gas-liquid contactor to from an exhaust gas stream from the process, the exhaust gas stream containing less than half the halogen gas than the gas stream contained, the exhaust gas stream containing more than half the carbon dioxide than the gas stream contained; and (e) flowing the contacted absorption liquor from the gas-liquid contactor to form a stream of used absorption liquor, the stream of used absorption liquor having a thiosulfate concentration of about 100 parts per million.

2. The process of claim 1, especially suitable when it is desired to increase the flow rate of fresh absorption liquor but not the flow rate of liquid waste, further comprising the steps of:

(f) flowing a portion of the used absorption liquor to waste thereby leaving a remaining portion of used absorption liquor; and (g) adding soft water, thiosulfate and base to the remaining portion of used absorption liquor to form fresh absorption liquor.

3. The process of claim 2, especially suitable when the concentration of halogen gases in the gas stream varies substantially, further including the steps of:

(h) analyzing the used absorption liquor for residual thiosulfate; and (i) controlling the adding of thiosulfate to the remaining portion of used absorption liquor of step (g) according to the analyses of step (h).

* * * * *